United States Patent [19]

Kanluen et al.

[11] Patent Number: 5,185,385
[45] Date of Patent: Feb. 9, 1993

[54] POLYMERIZATION PROCESS

[75] Inventors: Ratana Kanluen, Guelph; Brigitte H. Licht, Burlington, both of Canada

[73] Assignee: Texaco Chemical Company, White Plains, N.Y.

[21] Appl. No.: 685,197

[22] Filed: Apr. 15, 1991

Related U.S. Application Data

[63] Continuation-in-part of Ser. No. 2,975, Jan. 13, 1987.

[51] Int. Cl.$^5$ .................................................. C08F 2/48
[52] U.S. Cl. ........................................ 522/84; 522/13; 522/3
[58] Field of Search ................................ 522/84, 13, 3

[56] References Cited

U.S. PATENT DOCUMENTS

| | | | |
|---|---|---|---|
| 3,912,607 | 10/1975 | Communal et al. | 204/159.23 |
| 3,926,756 | 12/1975 | Restaino | 204/159.22 |
| 4,108,666 | 8/1978 | Hayashi et al. | 522/21 |
| 4,170,663 | 10/1979 | Hahn et al. | 522/72 |
| 4,325,794 | 4/1982 | Hunter et al. | 522/3 |

FOREIGN PATENT DOCUMENTS

| | | |
|---|---|---|
| 567778 | 3/1945 | United Kingdom . |
| 1053097 | 12/1966 | United Kingdom . |
| 1310729 | 10/1969 | United Kingdom . |
| 1332247 | 3/1970 | United Kingdom . |
| 1279108 | 6/1972 | United Kingdom . |
| 1379088 | 10/1972 | United Kingdom . |
| 1437281 | 5/1973 | United Kingdom . |

Primary Examiner—Joseph L. Schofer
Assistant Examiner—N. Sarofim
Attorney, Agent, or Firm—Jack H. Park; Kenneth R. Priem; Russell R. Stolle

[57] ABSTRACT

Vinyl monomers are polymerized in high yield to water-soluble polymers or copolymers by free radical polymerization of an aqueous reaction mixture containing the vinyl monomer(s), an UV-activated photoinitiator and a heat-activated chemical initiator. The polymerization is initially carried out by exposing the monomer mixture to UV radiation to activate the photoinitiator and then is carried out under the influence of free radicals produced by the chemical initiator.

12 Claims, No Drawings

POLYMERIZATION PROCESS

REFERENCE TO RELATED APPLICATION

This application is a continuation-in-part of copending U.S. patent application Ser. No. 002,975 filed Jan. 13, 1987.

FIELD OF INVENTION

The present invention relates to the formation of solid form water-soluble polymers and copolymers by a combination of photochemically- (photolysis and photoinitiator) and chemically- (thermal initiator) induced process.

BACKGROUND TO THE INVENTION

A plurality of procedures are known for the photopolymerization of vinyl monomers by free radical mechanisms. Such procedures involve radiation-induced processes which generate free radicals by the use of high energy ionizing radiation from radio-active sources, electron beams, X-rays or quartz UV-radiation, as described typically in U.S. Pat. No. 3,926,756 and U.K. Patents Nos. 1,279,108 and 1,437,281 and photochemically-induced processes, as described typically in U.K. Patents Nos. 567,778, 1,053,097 and 1,332,247.

More recently, U.K. Patents Nos. 1,310,729 and 1,379,088 have described a combination photochemically-and chemically-induced process. In this prior art, polymerization is carried out at pH values in the range of about 8 to 13, which is unsuitable for many vinyl monomers, such as acrylamide, acrylic-type and cationic monomers. In some instances, for example, in the case of acrylic or maleic alkyl ($C_1$ to $C_4$) esters, the high pH increases the hydrolytic decomposition of the monomers to lower alcohols, which may act as chain transfer agents and result in molecular weight limitations.

The specific examples contained in these prior art patents indicate a rather high maximum temperature of the polymerization mass, namely from about 115° to about 150° C. These high temperatures can bring about the risk of volatilization of materials in the solution being polymerized and form toxic vapors as well as promote localized cross-linking through chemical or free-radical routes.

In the prosecution of the parent application, there was cited U.S. Pat. No. 3,912,607 (Communal). This reference discloses a process for obtaining high molecular weight water-solution acrylic polymers and copolymers by polymerizing monomer solution of pH at least 8 using a photopolymerization initiator and subjecting the mixture of luminous radiation for 30 secs to 15 mins. The distinctions of the present invention over this art will become apparent below.

SUMMARY OF INVENTION

In accordance with the present invention, a novel method of polymerizing vinyl monomers is provided. The method involves the utilization of two different types of initiator, namely a photoinitiator capable of producing free radicals upon exposure to ultraviolet light and a chemical initiator (or so-called "thermal initiator") capable of producing free radicals when heated above a predetermined temperature. The polymerization process is commenced under the influence of free radicals produced by exposing the monomer mixture containing the photoinitiator to ultraviolet radiation of long wavelength, such as that usually obtained from a conventional low-pressure mercury lamp. Such polymerization reaction brings the temperature of the monomer mixture to the temperature required for the chemical initiator to dissociate into free radicals. The polymerization then continues to completion under the influence of the chemically-generated free radicals.

Such use of a combination of photochemical and chemical initiation results in high conversion of monomer to polymer without the attendant drawbacks of the prior art.

In accordance with the present invention, therefore, there is provided a method of polymerizing vinyl monomer(s) to a particulate water-soluble, substantially linear polymer or copolymer which comprises a plurality of steps. An aqueous monomer solution mixture, having a pH of about 3 to about 7, first is formed comprising at least one vinyl monomer polymerizable to the water-soluble polymer or copolymer, an ultraviolet-decomposable free radical initiator capable of producing free radicals upon exposure to ultraviolet radiation and a chemical free radical initiator capable of producing free radicals upon heating above a predetermined temperature. The monomer mixture then is exposed to longwave ultraviolet radiation having a wavelength of about 300 to about 400 nm so as to activate the photoinitiator and initiate the polymerization. The photolysis continues until the temperature of the system reaches the level at which the chemical initiator dissociates, at the required rate, so as to sustain the polymerization. The radiation is discontinued and the polymerization then continues to completion under the influence of the thermally-generated free radicals, while the maximum temperature is maintained in the range of about 60° C. to about 90° C. The resulting polymer then is particulated.

The process of the invention allows full control over the rate of polymerization which, in turn, provides the advantage of carrying out the polymerization of highly concentrated monomer solution, while maintaining the maximum temperature of polymerization in the range of about 60° C. to about 90° C., which substantially prevents any localized cross-linking and further minimizes the risk of generating volatile toxic materials promoted by high temperature.

A further advantage of the process of the present invention is that it is efficient, industrially simple and can be carried out batch-wise in shallow trays on a continuous basis. In such mode of operation, the monomer solution to be polymerized contained in a shallow tray is brought under the UV light source and held there until the temperature of the system reaches the level at which the chemical initiator dissociates, that tray then is removed from below the UV light source and a new tray is moved into place for irradiation.

One important feature of the process of the invention is that the pH of the monomer solution is in the range of about 3 to about 7, so that the process is suitable for a whole range of vinyl monomers, including non-ionic, anionic and cationic vinyl monomers.

This pH range contrasts with that employed in the Communal prior art referred to above, wherein the pH is always greater than 8.

In addition, in Communal, in all the working Examples, except one the final temperature is well above the upper limit permitted herein. In one Example, however (Example 9), a final temperature of 80° C. is disclosed. This Example does not specify the pH, but it must be greater than 8, since this limitation is generally required by Communal. In addition, in this specific Example, only an ultraviolet decomposable freeradical initiator is employed.

Accordingly, the process of the present invention is distinguished from the Communal prior art in providing the combination of features, in a free-radical initiated vinyl monomer polymerization procedure of:

(i) an initial pH of monomer solution of about 3 to about 7,
(ii) the employment of a combination of an ultraviolet-decomposable free-radical initiator and a thermally decomposable free-radical initiator, and
(iii) control of the final temperature of the polymer solution to the range of about 60° C. to about 90° C.

The combination of steps allows a wide variety of nyl monomers to be employed, yields of at least 99% to be obtained and localized cross-linking and the formation of volatile toxic material to be avoided.

GENERAL DESCRIPTION OF INVENTION

The present invention provides a process for the manufacture of water-soluble polymers and copolymers of vinyl monomers or mixtures of such monomers. The vinyl monomers with which the present invention is concerned preferably have the formula:

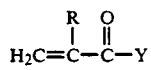

wherein:
R represents hydrogen, a methyl group or an ethyl group; and
Y represents

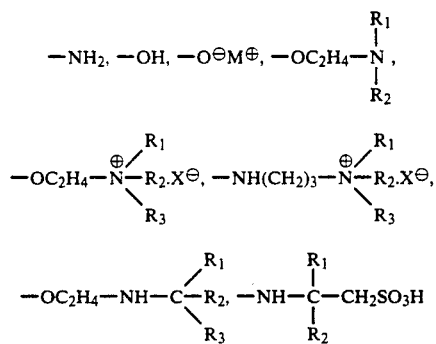

or its alkali metal salts in which $R_1$, $R_2$ and $R_3$ individually represent alkyl groups containing from 1 to 4 carbon atoms, $M\oplus$ represents $NH_4\oplus$ or an alkali metal cation, and $X\ominus$ represents an anion.

Using the process of the present invention, such vinyl monomers may be polymerized to a wide range of molecular weight, usually in the range of about 50,000 to about 15,000,000.

The present invention involves the use of both photoinitiators and chemical initiators. Photoinitiation is effected by exposing the monomer mixture to long wave ultraviolet radiation, generally about 300 to about 400 nm, usually at a radiation intensity in the range of about 1000 to about 4000 microwatts/cm$^2$.

The amount of photoinitiator employed in the monomer mixture may vary widely, depending on the activity of the initiator and the intensity of the radiation which is applied. The amount of photoinitiator may range from about 40 to about 200 ppm, based on the weight of monomer. Any known photoinitiator may be employed, for example, benzophenone, benzoin and its alkyl ethers or other carbonyl-containing compounds.

The polymerization under the influence of the free radicals produced by the photoinitiator is exothermic, so that the temperature of the reaction mixture rises towards the temperature at which the chemical initiator dissociates to free radicals. The dissociation temperature depends on the nature of the chemical initiator and preferably is in the range of about 35° C. to about 70° C.

The chemical free-radical initiators may be selected from compounds known to generate free radicals upon heating, including azo-type compounds, persulfates and organic peroxides. Specific examples of azo-type compounds which are effective at temperatures of about o 35° C. to 70° C. are 2,2,-azobis(2-amidinopropane) dihydrochloride, azobisisobutyronitrile, 2,2'-azobis-(2-methylpropionitrile) and 4,4'-azobis(4-cyanopentanoic acid). Such chemical free-radical initiators may be employed in amounts from about 50 to about 400 ppm, based on the weight of monomer.

Chain transfer agents also may be present and usually are employed to control molecular weight. Examples of suitable materials are formic acid, alkali metal salts thereof, secondary alcohols, such as isopropanol, and water-soluble mercaptans. When present, such chain transfer agents are employed in amounts up to about 25,000 ppm, based on the weight of the monomer, depending on the effectiveness of the chain transfer agent and the required polymer molecular weight.

The polymers which are obtained from the polymerization process are homogeneous, substantially linear, of a wide range of molecular weight, usually from about 50,000 to about 15,000,000, and water-soluble. The polymerization process is very efficient and produces polymer in very high yield, over 99%.

The free-radical polymerization reactions are exothermic which, at high monomer concentrations, can lead to a substantial increase in temperature, which, in turn, leads to an increase in reaction rates. To produce the desired polymers and to avoid undesirable molecular weight and distribution, control of these effects is required.

The rate and degree of polymerization also depend on a number of other factors, including monomer concentration, pH of the reaction medium, concentration of initiators, the presence of any chain transfer agent, thickness of polymerization mass and UV radiation intensity.

The polymerization process typically is effected in a batch operation, although continuous operation also is possible, as described above. In the batch process, an aqueous solution of the monomer is positioned in the reaction vessel to a depth, which may vary from a few millimeters to about 10 cms. The concentration of monomer in the solution also may vary widely, generally from about 30 to about 70 wt. %, depending on the chemical nature of the vinyl monomer and the required molecular weight of polymer.

EXAMPLES

Example 1

This Example illustrates the polymerization of acrylamide using photochemical and chemical initiators.

A 40% (w/w) aqueous acrylamide solution at pH 5.0 was transferred into a polyethylene tray. The depth of the monomer solution was 70 mm. The monomer solution was deaerated with nitrogen. To this solution were added 1.15% of isopropyl alcohol (chain transfer agent), 135 ppm of benzoin methyl ether (photoinitiator) and 160 ppm of 2,2,-azobis(2-amidinopropane) dihydrochloride (chemical initiator), all based on the weight of monomer.

The monomer mixture then was irradiated with ultraviolet light from a low pressure mercury lamp (wavelength 365 nm) at a radiation level of approximately 2500 microwatts/cm$^2$. The radiation was continued until the temperature of the polymerization mass had reached 42° C. The radiation thereupon was terminated and the polymerization was allowed to continue under the influence of free radicals produced by the chemical (thermal) initiator. The product was a firm rubbery gel and was obtained in a yield exceeding 99%.

The product was permitted to cool to room temperature, before being particulated and dried in a fluid bed dryer at 40° C. for two hours.

The polymer so produced was completely water-soluble, i.e. no insoluble gel was obtained. The Brookfield viscosity of a 0.5% aqueous polymer solution was 60 cps (spindle #1, at 12 rpm).

Example 2

This Example illustrates the synthesis of anionic copolymers of vinyl monomers using the procedure of Example 1.

(a) The procedure of Example 1 was repeated for an aqueous monomer solution containing 42.5 wt. % of a mixture of 70 mole % acrylamide and 30 mole % acrylic acid, adjusted to pH 5.5 by the addition of sodium hydroxide and cooled to 10° C. To this solution, 60 ppm of sodium formate, 135 ppm of benzoin methyl ether and 185 ppm of 2,2'-azobis(2-amidinopropane) dihydrochloride were added. In this instance, UV irradiation was continued until the temperature reached 45° C.

The copolymer so produced was completely water-soluble. The Brookfield viscosity of a 0.1% aqueous solution was 850 cps (spindle #2, at 12 rpm).

(b) The procedure of Example 1 was repeated for an aqueous monomer solution containing 55 wt. % of a mixture of 80 mole % acrylamide and 20 mole % 2-acrylamido-2-methylpropane sulfonic acid which was adjusted to pH 9.0 using sodium hydroxide and to which was subsequently added 50 ppm of sodium formate, 45 ppm of 2,2-dimethoxy-2-phenylacetophenone and 120 ppm of 2,2,-azobis(2-aminodinopropane) dihydrochloride. In this instance, UV radiation was continued until the temperature reached 45° C.

The copolymer so produced was readily soluble in water and a 0.1% solution of the copolymer had a Brookfield viscosity of 450 cps (spindle #1, at 6 rpm).

Example 3

This Example illustrates the synthesis of cationic copolymers of vinyl monomers using the procedure of Example 1.

The procedure of Example was repeated for an aqueous monomer solution containing 40.0 wt. % of a mixture of 90 mole % acrylamide and 10 mole % of quaternized dimethylaminoethylmethylmethacrylate; the pH was adjusted to 4.0 by the addition of acetic acid. To this solution, were added 150 ppm of 2,2-azobis(2-amidinopropane) dihydrochloride and 100 ppm of 2,2-dimethoxy-2-diphenylacetophenone. This monomer mixture was irradiated with ultraviolet light until the temperature of the polymerization mass reached 50° C.

The copolymer so obtained was completely water-soluble and had Brookfield viscosity of a 0.5% polymer solution of 1750 cps (spindle # 2, at 6 rpm).

SUMMARY OF DISCLOSURE

In summary of this disclosure, the present invention provides a novel method of producing water-soluble polymers and copolymers of vinyl monomers by free radical polymerization, using two different types of free radical initiator which are sequentially activated. Modifications are possible within the scope of the invention.

What we claim is:

1. A method of polymerizing at least one vinyl monomer to a particulate, water-soluble, substantially linear polymer or copolymer, which comprises:

forming an aqueous monomer solution mixture having a pH of about 3 to about 7 comprising at least one vinyl monomer polymerizable to said water soluble polymer or copolymer, an ultraviolet-decomposable free radical initiator capable of producing free radicals upon exposure to ultraviolet radiation, and a chemical free radical initiator capable of producing free radicals upon heating above a predetermined temperature, initiating polymerization of said at least one monomer by irradiating said monomer mixture with long wavelength ultraviolet radiation in the wavelength from about 300 to about 400 nm, permitting said polymerization to be effected while said monomer mixture increases in temperature to said predetermined temperature, so as to activate said chemical initiator, discontinuing said irradiation and permitting said polymerization of said at least one monomer to be effected above said predetermined temperature until complete while maintaining the maximum temperature of said monomer mixture in the range of about 60° C. to about 90° C. to obtain the polymer in a yield exceeding 99%, and particulating the polymer so produced.

2. The method of claim 1 wherein said vinyl, monomer has the formula:

$$\begin{array}{c} R \quad O \\ | \quad \| \\ H_2C=C-C-Y \end{array}$$

wherein:

R represents hydrogen, a methyl group or an ethyl group; and

Y represents

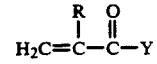

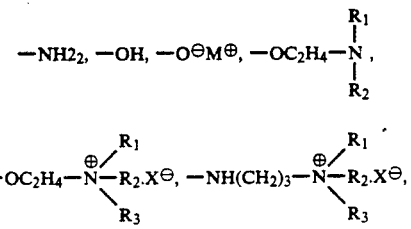

-continued

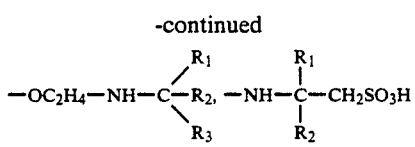

or its alkali metal salts in which $R_1$, $R_2$ and $R_3$ individually represent alkali groups containing from 1 to 4 carbon atoms, $M \oplus$ represents $NH_4 \ominus$ or an alkali metal cation, and $X \ominus$ represents an anion.

3. The method of claim 2 wherein said ultraviolet radiation is applied to said monomer mixture at an applied radiation intensity of about 1000 to about 4000 microwatts/cm².

4. The method of claim 3 wherein said photoinitiator is used in an amount of about 40 to about 200 ppm, based on the weight of monomer.

5. The method of claim 4 wherein said predetermined temperature of dissociation of said chemical initiator is about 35° C. to about 70° C.

6. The method of claim 5 wherein said chemical initiator is used in an amount of about 50 to about 400 ppm, based on the weight of monomer.

7. The method of claim 6 wherein said monomer mixture also contains at least one chain transfer agent.

8. The method of claim 7 wherein said chain transfer agent is present in an amount up to about 25,000 ppm, based on the weight of monomer.

9. The method of claim 8 wherein said monomer(s) is present in the monomer mixture in a concentration of about 30 to about 7 wt. %.

10. The method of claim 9 wherein said polymerization process is effected in a batch operation using a monomer mixture having a depth of from a few millimeters to about 10 cms.

11. The method of claim 9 wherein said polymerization is effected in a continuous operation in which successive batches of monomer mixture contained in shallow trays to a depth of from a few millimeters to about 10 cms are exposed to ultraviolet radiation until said predetermined temperature is reached and the tray is removed from said exposure to be replaced by the next tray.

12. The method of claim 1 effected to produce a vinyl polymer or copolymer of molecular weight in the range of about 50,000 to about 15,000,000.

* * * * *